United States Patent
Dworakowski et al.

(10) Patent No.: US 11,654,864 B2
(45) Date of Patent: *May 23, 2023

(54) HEATING DEVICE

(71) Applicant: APTIV TECHNOLOGIES LIMITED, St. Michael (BB)

(72) Inventors: Waldemar Dworakowski, Cracow (PL); Rafal Dlugosz, Poznan (PL)

(73) Assignee: Aptiv Technologies Limited, St. Michael (BB)

( * ) Notice: Subject to any disclaimer, the term of this patent is extended or adjusted under 35 U.S.C. 154(b) by 469 days.

This patent is subject to a terminal disclaimer.

(21) Appl. No.: 16/713,063

(22) Filed: Dec. 13, 2019

(65) Prior Publication Data
US 2020/0189523 A1    Jun. 18, 2020

(30) Foreign Application Priority Data
Dec. 18, 2018   (EP) ..................................... 18213507

(51) Int. Cl.
*B60S 1/02* (2006.01)
*B60S 1/56* (2006.01)
(Continued)

(52) U.S. Cl.
CPC ................. *B60S 1/026* (2013.01); *B60S 1/56* (2013.01); *H05B 6/06* (2013.01); *H05B 6/44* (2013.01);
(Continued)

(58) Field of Classification Search
CPC .. B60R 11/04; B60R 2011/0026; B60S 1/026; B60S 1/56; H05B 6/06; H05B 6/105; H05B 6/44
(Continued)

(56) References Cited

U.S. PATENT DOCUMENTS 3,058,840 A * 10/1962 Elmer ....................... C23C 2/28
266/107
3,250,636 A * 5/1966 Wilferth ................. G03G 19/00
250/318
(Continued)

FOREIGN PATENT DOCUMENTS

CA          2790428 A1 *  3/2013   ......... B29C 35/0805
CN       101553765       10/2009
(Continued)

OTHER PUBLICATIONS

DE-102004057322-A1 (DE102004057322_translation.pdf) (Year: 2006).*
(Continued)

*Primary Examiner* — Nathaniel E Wiehe
*Assistant Examiner* — Ket D Dang
(74) *Attorney, Agent, or Firm* — Sawtooth Patent Group PLLC

(57) ABSTRACT

A heating device includes a housing, a primary induction coil, a controller circuit, and a secondary induction coil. The housing retains a camera lens. The primary induction coil is positioned proximate the housing and generates a magnetic field in response to receiving electrical power from a power supply. The controller circuit is in electrical contact with the primary induction coil and controls the electrical power delivered to the primary induction coil. The secondary induction coil overlays the primary induction coil and receives the magnetic field from the primary induction coil and generates heat. The secondary induction coil is in direct contact with a windshield of a vehicle and heats the viewing window when the primary induction coil receives the electrical power.

20 Claims, 4 Drawing Sheets

(51) Int. Cl.
*H05B 6/06* (2006.01)
*H05B 6/44* (2006.01)
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
USPC ............ 219/203, 10.41, 10.43, 10.57, 10.67, 219/10.71, 10.75, 1.49 R; 118/58, 620, 118/621, 623, 640, 641, 643, 642, 644; 34/1, 4, 43, 243 C; 427/45.1, 372.2
See application file for complete search history.

(56) References Cited

U.S. PATENT DOCUMENTS

| | | | |
|---|---|---|---|
| 2006/0035051 A1* | 2/2006 | Lhoest | B32B 17/10761 219/203 |
| 2006/0171704 A1 | 8/2006 | Bingle et al. | |
| 2007/0023424 A1* | 2/2007 | Weber | A61F 2/86 219/635 |
| 2007/0132318 A1* | 6/2007 | Schmidt | H02M 3/16 307/116 |
| 2008/0034528 A1* | 2/2008 | Bourke | B60S 1/3805 15/250.06 |
| 2010/0016671 A1 | 1/2010 | Wieters et al. | |
| 2010/0078427 A1 | 4/2010 | Haas et al. | |
| 2012/0243093 A1* | 9/2012 | Tonar | G02B 27/0006 359/507 |
| 2013/0032973 A1* | 2/2013 | Lucas | C04B 35/64 264/447 |
| 2014/0158680 A1* | 6/2014 | Kitaizumi | H02J 50/80 219/665 |
| 2014/0238978 A1* | 8/2014 | Kitaizumi | H05B 6/06 219/661 |
| 2015/0160536 A1 | 6/2015 | Lang et al. | |
| 2016/0091714 A1* | 3/2016 | Hui | H04N 23/57 359/512 |
| 2018/0170314 A1 | 6/2018 | Paule et al. | |
| 2018/0210161 A1 | 7/2018 | Park et al. | |
| 2018/0283913 A1* | 10/2018 | Chen | A61B 5/0008 |
| 2019/0006209 A1* | 1/2019 | Wieser | F25B 21/02 |
| 2019/0033579 A1* | 1/2019 | Ohsumi | H04N 5/2257 |
| 2020/0189523 A1 | 6/2020 | Dworakowski et al. | |
| 2020/0192085 A1* | 6/2020 | Dworakowski | H05B 6/44 |

FOREIGN PATENT DOCUMENTS

| | | | |
|---|---|---|---|
| CN | 101766049 A | 6/2010 | |
| CN | 102187273 A * | 9/2011 | .......... G02B 27/646 |
| CN | 102736369 | 10/2012 | |
| CN | 102789115 | 11/2012 | |
| CN | 104618630 | 5/2015 | |
| CN | 104717410 | 6/2015 | |
| CN | 204405924 U | 6/2015 | |
| CN | 106200214 | 12/2016 | |
| CN | 205901891 U | 1/2017 | |
| CN | 206096730 U | 4/2017 | |
| CN | 107942502 | 4/2018 | |
| CN | 207416705 | 5/2018 | |
| CN | 108535939 A | 9/2018 | |
| CN | 108803201 | 11/2018 | |
| CN | 208175020 | 11/2018 | |
| DE | 102007004275 | 7/2008 | |
| EP | 3001674 A1 | 3/2016 | |
| GB | 835161 | 11/1957 | |
| KR | 20150124197 | 11/2015 | |
| WO | 2018015856 A2 | 1/2018 | |
| WO | 2018184892 A1 | 10/2018 | |

OTHER PUBLICATIONS

"Extended European Search Report", EP Application No. 18213511.1, dated Jun. 19, 2019, 6 pages.
Extended European Search Report for Application No. EP 18 21 3507 dated Jun. 19, 2019.
"Foreign Office Action", CN Application No. 201911280305.1, dated Aug. 12, 2021, 15 pages.
"Foreign Office Action", CN Application No. 201911280725.X, dated Aug. 24, 2021, 16 pages.
"Notice of Opposition", EP Application No. 18213507.9, dated Apr. 7, 2022, 18 pages.
"Notice of Opposition", EP Application No. 18213511.1, dated Apr. 7, 2022, 12 pages.
"Summons to Attend Oral Proceedings", EP Application No. 18213511.1, dated Sep. 22, 2022, 10 pages.
"Summons to Attend Oral Proceedings", EP Application No. 18213507.9, dated Feb. 2, 2023, 20 pages.

* cited by examiner

HEATING DEVICE

CROSS REFERENCE TO RELATED APPLICATIONS

This application claims priority to EP Application No. 18213507.9, which was filed on 18 Dec. 2018.

TECHNICAL FIELD

The present disclosure relates generally to a heating device that clears condensation from a viewing window of a camera.

BACKGROUND

Typical heating devices require electrical terminals and wiring attached to a windshield or cover-glass. United States Patent Application Publication Number 2006/0171704 A1 describes a heating element for heating a transparent camera lens cover that includes electrical terminals in contact with a surface of the transparent camera lens cover. Other applications describe a heating element positioned on a lens holder, and resilient contacts used to heat a camera lens.

SUMMARY OF THE DISCLOSURE

The present disclosure proposes to solve the above mentioned problem by providing a heating device comprising a housing configured to retain a camera lens, a primary induction coil positioned proximate the housing and configured to generate a magnetic field in response to receiving electrical power from a power supply, a controller circuit in electrical contact with the primary induction coil configured to control the electrical power delivered to the primary induction coil, and a secondary induction coil overlaying the primary induction coil configured to receive the magnetic field from the primary induction coil and generate heat. The secondary induction coil is in direct contact with a windshield of a vehicle and defines a viewing window through which the camera lens views a surrounding area. The secondary induction coil heats the viewing window when the primary induction coil receives the electrical power.

According to other advantageous features of the present disclosure:

the primary induction coil surrounds an optical axis of the camera lens;

the controller circuit includes a low-Q resonant circuit in electrical communication with the primary induction coil;

a temperature of the secondary induction coil is controlled by adjusting a voltage applied to the primary induction coil;

a temperature of the secondary induction coil is controlled by adjusting a frequency of a signal delivered to the primary induction coil;

the secondary induction coil is comprised of a first layer of resistive material and a second layer of low-Curie point ferrite;

the secondary induction coil is located between glass layers of the windshield;

the secondary induction coil is located on an inner surface of the windshield;

the secondary induction coil is located on an outer surface of the windshield;

the secondary induction coil is formed of a conductive material having a greater electrical resistance relative to the primary induction coil;

the secondary induction coil is characterized as segmented, wherein adjoining segments are formed of materials having a different electrical conductivity from one another;

a distance between the primary induction coil and the secondary induction coil is in a range from 0.0 mm to 10.0 mm;

a number of windings on the primary induction coil is at least one;

a number of windings on the secondary induction coil is at least one;

the secondary induction coil has a thickness in a range from 1.0 µm to 1000 µm;

the secondary induction coil has a width in a range from 0.1 mm to 10 mm.

BRIEF DESCRIPTION OF THE DRAWINGS

The present disclosure is now described by way of example with reference to the accompanying drawings in which.

DESCRIPTION OF THE EMBODIMENTS

Figure 1:
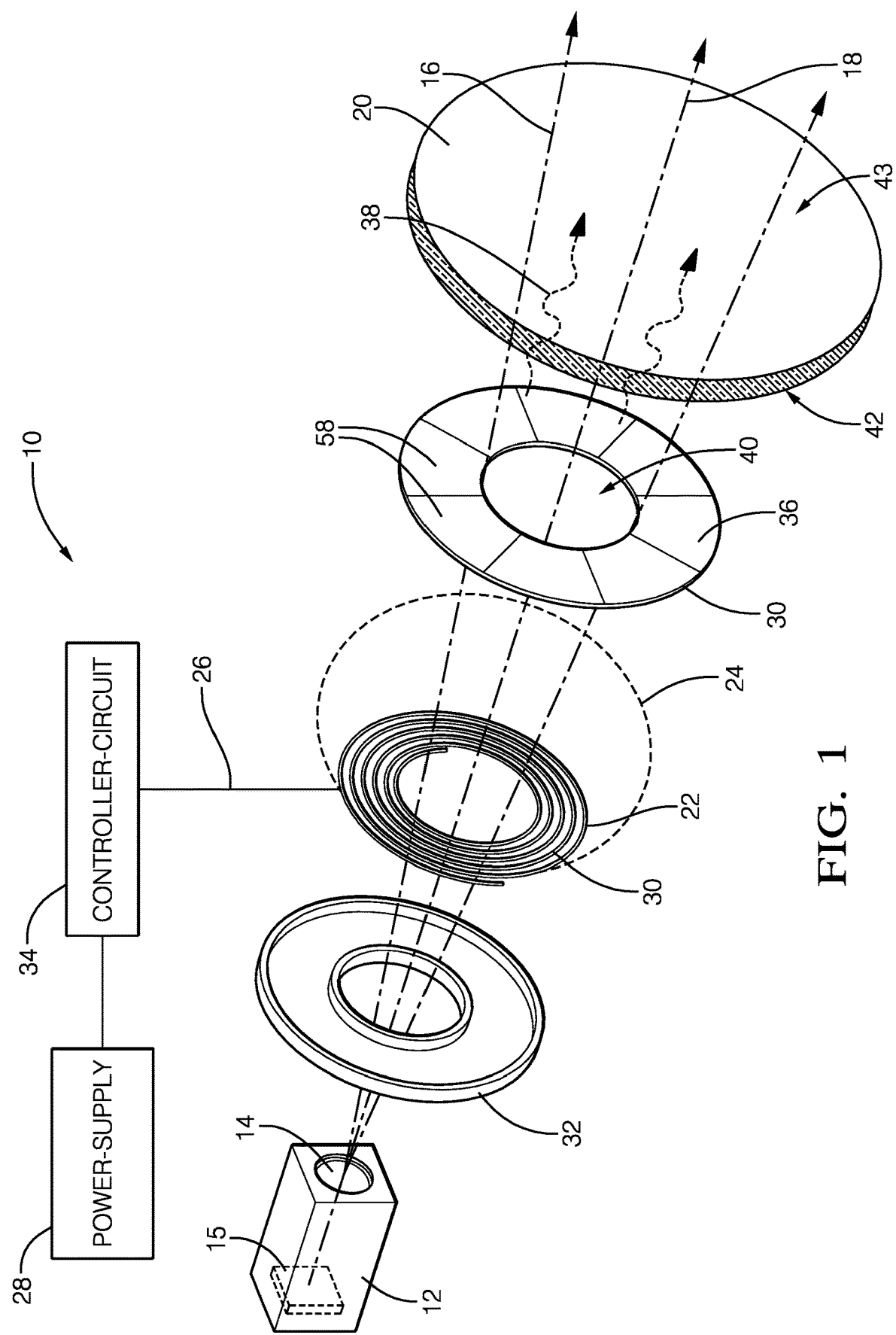
FIG. 1 is an exploded perspective view of a heating device according to an embodiment of the disclosure.

Hereinafter, a heating device 10 for a windshield 20 and/or a cover-glass according to an embodiment of the present disclosure will be described with reference to the figures. FIG. 1 is an exploded perspective view illustrating the heating device 10, hereafter referred to as the device 10. The device 10 includes a housing 12 configured to retain a camera lens 14. The housing 12 may be formed of any material, such as a polymeric material, a ceramic, or a metal. The housing 12 may have a circular cross section or may have any other cross section, such as a rectilinear cross section. The housing 12 may include an imager 15 used to render an image of a surrounding area. The camera lens 14 defines a field-of-view 16 and an optical axis 18 as illustrated in FIG. 1. The housing 12 may be mounted on a front of a vehicle, on sides of a vehicle, on a rear of a vehicle, or mounted in the interior of the vehicle at a location suitable for the camera to view the area around the vehicle through the windshield 20. In the examples illustrated herein, the housing 12 is mounted inside the vehicle with the view through the windshield 20.

The device 10 also includes a primary induction coil 22 positioned proximate the housing 12 and configured to generate a magnetic field 24 in response to receiving electrical power 26 from a power supply 28. The power supply 28 may be a direct-current (DC) power supply 28, or may be an alternating-current (AC) power supply 28. In the examples illustrated herein the power supply 28 is an AC power supply 28. The primary induction coil 22 surrounds the optical axis 18 of the camera lens 14 and may also surround a portion of the housing 12. A number of windings 30 (e.g., wires, conductive traces, etc.) on the primary induction coil 22 is at least one and are preferably wound onto a ferromagnetic core 32 (e.g. iron, ferrites, etc.). It will be appreciated that the number of windings 30 will increase with the increasing size of the area required to be heated. It will also be appreciated that the ferromagnetic core 32 may be omitted (i.e., an air core coil) depending on packaging and weight constraints. A single winding 30 (i.e. a single wire) of the primary induction coil 22 may be any diameter, and in the examples illustrated herein, preferably has the diameter in a range from 0.2 mm to 1.0 mm. The windings 30 may be formed of any electrically conductive material, such as copper alloys or aluminum alloys and may include a dielectric layer on a surface of the windings 30.

The device 10 also includes a controller circuit 34 in electrical contact with the primary induction coil 22. The power supply 28 may be separate or integral to the controller circuit 34, and in the examples illustrated herein, the power supply 28 is integral to the controller circuit 34. The controller circuit 34 is configured to control the electrical power 26 delivered to the primary induction coil 22. The controller circuit 34 may include a processor (not shown) such as a microprocessor or other control circuitry such as analog and/or digital control circuitry including an application specific integrated circuit (ASIC) for processing data as should be evident to those in the art. The controller circuit 34 may include a memory (not shown), including non-volatile memory, such as electrically erasable programmable read-only memory (EEPROM) for storing one or more routines, thresholds, and captured data. The one or more routines may be executed by the processor to perform steps for determining the electrical power 26 delivered to the primary induction coil 22 based on signals received by the controller circuit 34 from the primary induction coil 22, as described herein.

The device 10 also includes a secondary induction coil 36 overlaying the primary induction coil 22. The secondary induction coil 36 is configured to receive the magnetic field 24 from the primary induction coil 22, thereby generating heat 38. The magnetic field 24 from the primary induction coil 22 induces an electrical current in the secondary induction coil 36. The induced electrical current in the secondary induction coil 36 causes the secondary induction coil 36 to increase in temperature because the secondary induction coil 36 is formed of a material that has an electrical resistance. The electrical resistance of the secondary induction coil 36 resists the flow of electrical current within the secondary induction coil 36, which generates the heat 38 (also known as Joule heating or Ohmic heating). It will be appreciated that no wire connections exist between the primary induction coil 22 and the secondary induction coil 36. This has the technical benefit of reducing a size and complexity of the overall assembly. The secondary induction coil 36 also surrounds the optical axis 18 and is in direct contact with the windshield 20 of the vehicle. In the example illustrated in FIG. 1, the secondary induction coil 36 is located on an inner surface 42 of the windshield 20. In an alternative embodiment the secondary induction coil 36 may be located on an outer surface 43 of the windshield 20.

The secondary induction coil 36 defines a viewing window 40 through which the camera lens 14 views the surrounding area. That is, an inner diameter of the secondary induction coil 36, as illustrated in FIG. 1, creates a "window" through which light rays may pass to the camera lens 14 and imager 15. The secondary induction coil 36 heats the viewing window 40 and removes condensation (e.g., fog, ice, etc.) when the primary induction coil 22 receives the electrical power 26 from the controller circuit 34. A heating rate and a maximum temperature is controlled to inhibit a thermal shock to the windshield 20, and also to prevent an unsafe surface temperature of the windshield 20 for human contact.

Figure 2:
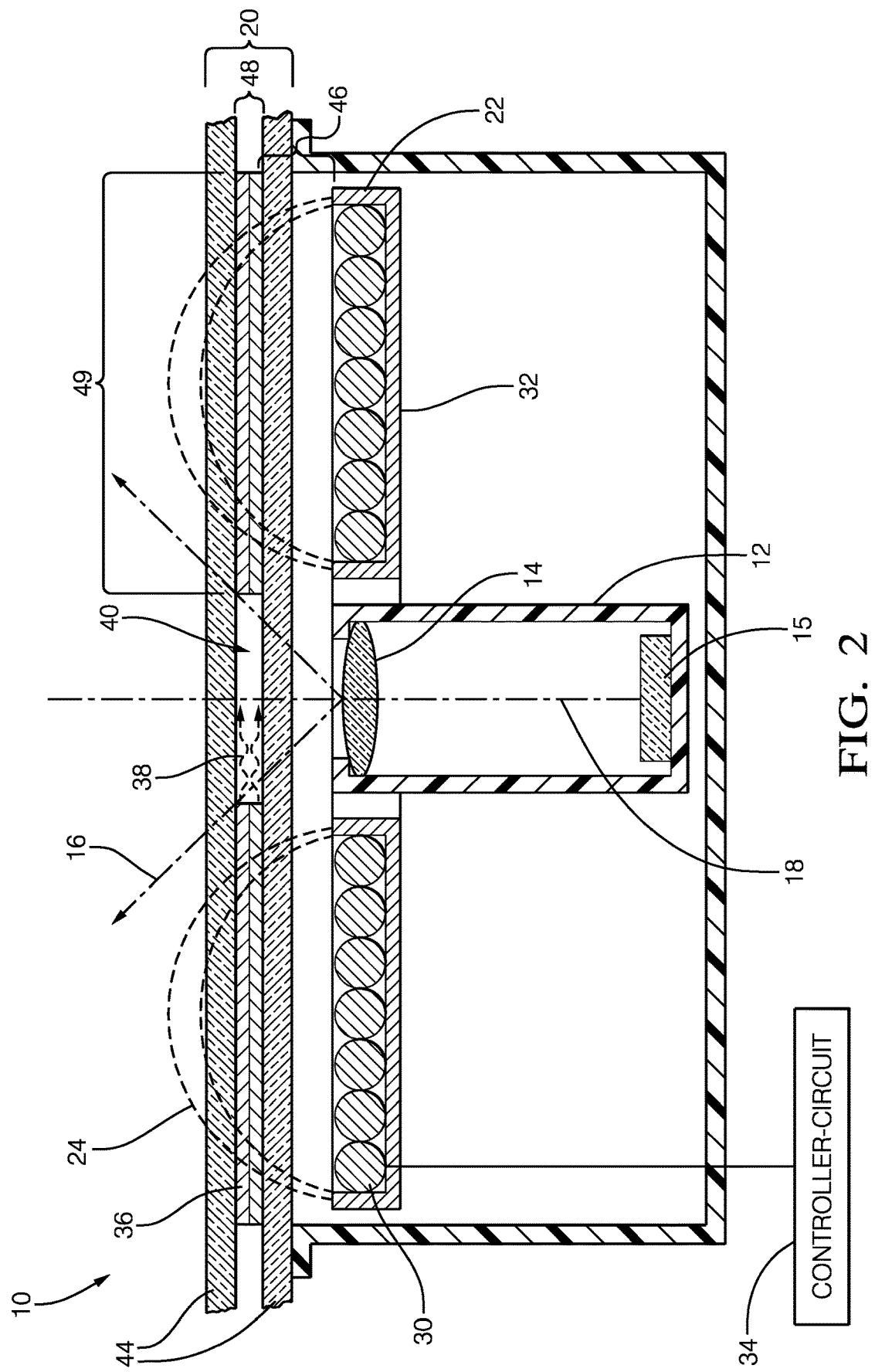
FIG. 2 is a section view of the heating device of FIG. 1.

FIG. 2 is a section view of the device 10 and illustrates an embodiment where the secondary induction coil 36 is located between glass layers 44 of the windshield 20. A distance 46 between the primary induction coil 22 and the secondary induction coil 36 is preferably in a range from 0.0 mm to about 10.0 mm. The distance 46 primarily impacts a coupling of the primary induction coil 22 and the secondary induction coil 36.

The number of windings 30 on the secondary induction coil 36 is at least one, and may be increased to achieve a specific temperature profile applied to the windshield 20. The windings 30 on the secondary induction coil 36 may be a single flat winding 30 that may be deposited using a thick-film ink, for example. The secondary induction coil 36 as illustrated in FIG. 2 has a thickness 48 in the range from about 1 µm to about 1000 µm. The thickness 48 may be adjusted based on the type of material comprising the secondary induction coil 36, and based on a frequency 50 of the electrical power 26 delivered to the primary induction coil 22. In an embodiment, the secondary induction coil 36 has a thickness 48 of 400 µm and is formed of a material with a low relative magnetic permeability (e.g., silver, aluminum, etc.). In another embodiment, the secondary induction coil 36 is formed of a material having higher relative magnetic permeability (e.g., iron) having a thickness 48 of 15 µm. The thickness 48 may also be reduced by increasing the frequency 50 of the of the electrical power 26 delivered to the primary induction coil 22. The secondary induction coil 36 has a width 49 in a range from about 0.1 mm to 10 mm, and preferably has the width 49 of about 5 mm due to packaging constraints on the windshield 20. It will be appreciated that the width 49 of the secondary induction coil 36 affects the heat transfer to the windshield 20. The width 49 may be user defined depending on a desired heating profile for the windshield 20.

Figure 3:
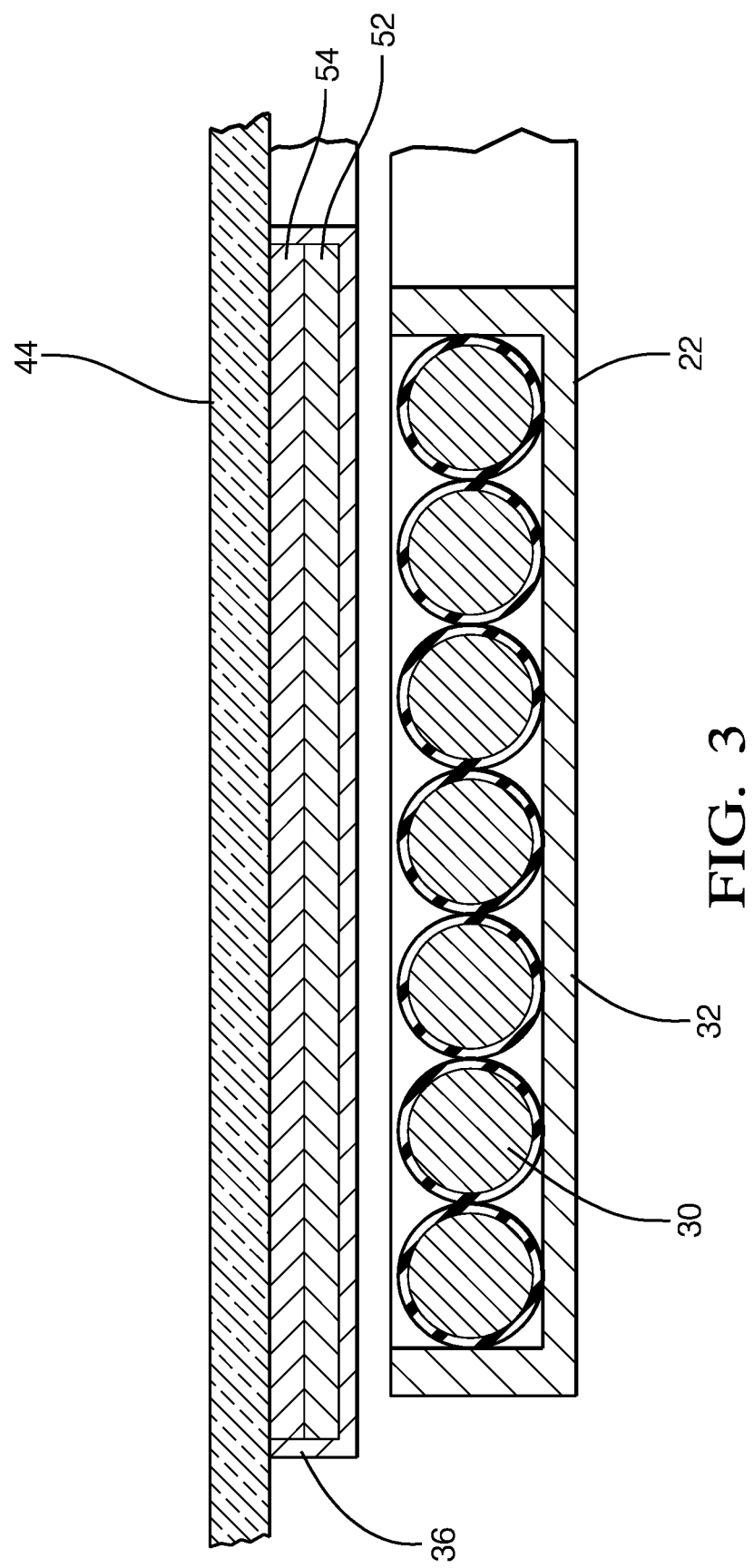
FIG. 3 is a section view of a portion of the heating device of FIG. 2.

FIG. 3 is a magnified view of a portion of the device 10 of FIG. 1. The secondary induction coil 36 is preferably comprised of a first layer 52 of resistive material that dissipates the power transmitted by the magnetic field 24, and a second layer 54 of low-Curie point ferrite. When the secondary induction coil 36 reaches a Curie point temperature (e.g. approximately 90 degrees Celsius for a Mn—Zn ferrite at 8 µm-9 µm thickness 48), the magnetic permeability of the second layer 54 is decreased, thereby reducing the induced heating of the secondary induction coil 36. This reduction of the induced heating of the secondary induction coil 36 changes a resonant-frequency of a control circuit 56, the benefit of which will be described in more detail below. Preferably, the secondary induction coil 36 is formed of a conductive material having a greater electrical resistance than that of the primary induction coil 22. The first layer 52 and the second layer 54 may also have a protective coating (not specifically shown) applied to their exposed surfaces to improve a durability of the layers.

Referring back to FIG. 1, the secondary induction coil 36 may be characterized as segmented 58, wherein adjoining segments 58 are formed of materials having a different electrical conductivity from one another. That is, a first segment may have a relatively low electrical resistance thereby emitting a relatively low quantity of heat 38, wherein a second segment in contact with the first segment may have a higher electrical resistance compared to the first segment, thereby emitting a larger quantity of heat 38 than the first segment. This segmentation 58 has the technical benefit of enabling a specific heating profile on the windshield 20. For example, preferentially heating corners of a rectangular viewing window 40 where the corners are a greater length away from the optical axis 18 compared to a side of the rectangular viewing window 40 that may be closer to the optical axis 18. It will be appreciated that other patterns of segmentation 58 are possible based on a geometry of the viewing window 40.

Figure 4:
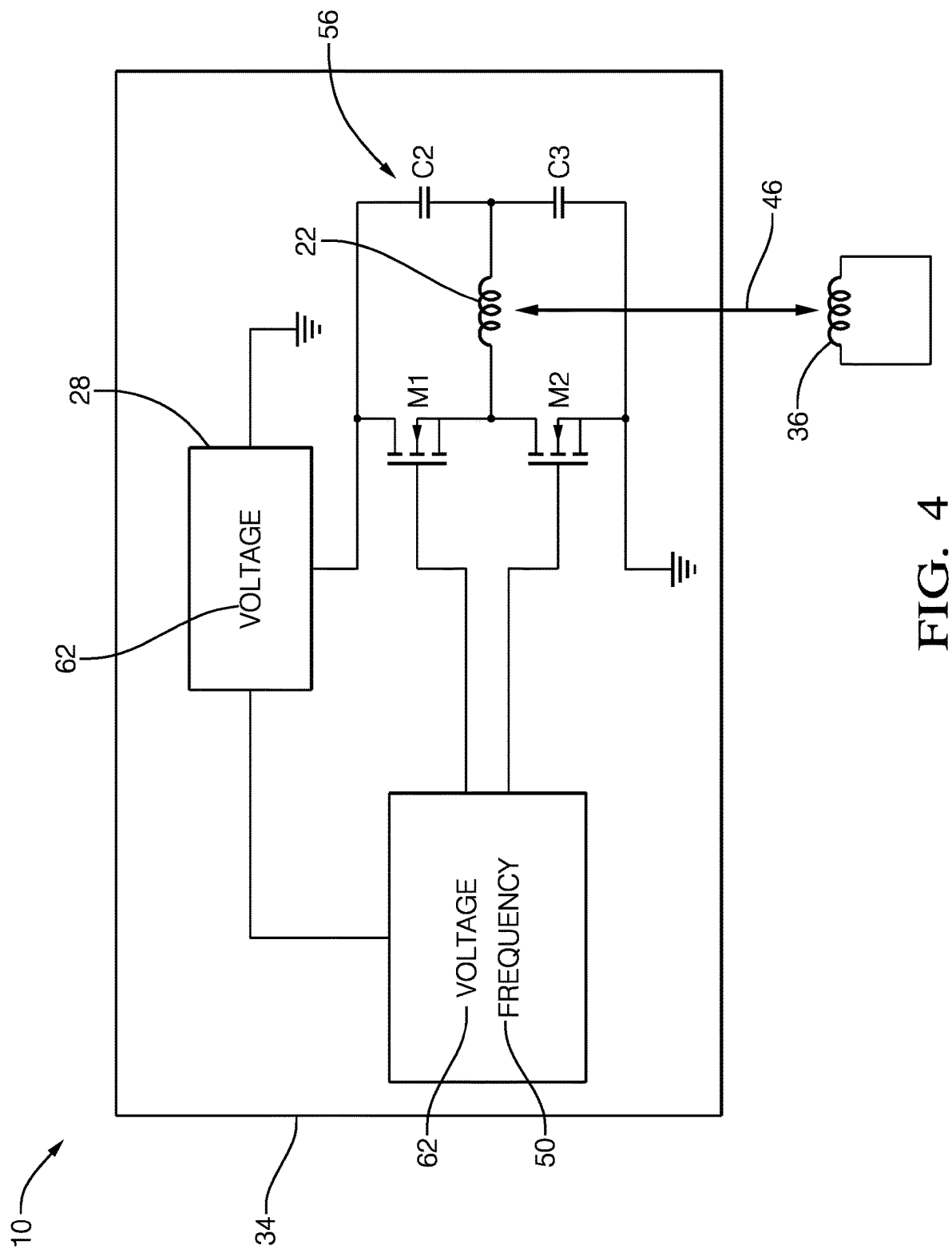
FIG. 4 is a schematic of the heating device of FIG. 1 illustrating a controller circuit.

FIG. 4 is a schematic diagram of the device 10 illustrating the controller circuit 34. The controller circuit 34 preferably includes a low-Q resonant control circuit 56 in electrical communication with the primary induction coil 22. A Q-factor (i.e., quality factor) of an electronic circuit is a parameter that describes the resonance behavior of a harmonic oscillator or resonator. The low-Q factor is indicative of an overdamped system that does not resonate or oscillate. The low-Q resonant control circuit 56 has the technical benefit of improved temperature control in the secondary induction coil 36. It will be appreciated that the values of capacitors C1 and C2 (not specifically shown) may be selected to achieve the desired resonant-frequency to drive the secondary induction coil 36 and produce the desired heat 38. The temperature of the secondary induction coil 36 may be controlled by adjusting a voltage 62 applied to, and/or adjusting the frequency 50 of a signal delivered to, the primary induction coil 22 through the MOSFETs M1 and M2 (not specifically shown) and through the power supply 28. The controller circuit 34 is configured to monitor an impedance of the primary induction coil 22, which is directly related to the temperature of the secondary induction coil 36, and controls the voltage 62 and/or frequency 50 (e.g. 40 kHz) to maintain proper operation of the control circuit 56. This method of temperature measurement has the technical benefit or eliminating a separate temperature sensor mounted to the windshield 20.

The invention claimed is:

1. A heating device comprising:
    a housing configured to retain a camera lens;
    a primary induction coil positioned proximate the housing and configured to generate a magnetic field in response to receiving electrical power from a power supply, the primary induction coil surrounding an optical axis of the camera lens;
    a controller circuit in electrical contact with the primary induction coil configured to control the electrical power delivered to the primary induction coil; and
    a secondary induction coil overlaying the primary induction coil and configured to receive the magnetic field from the primary induction coil and generate heat;
    wherein the secondary induction coil is disposed within a windshield of a vehicle or on an inner surface of the windshield and defines a viewing window through which the camera lens views a surrounding area;
    wherein the secondary induction coil directly heats the viewing window of the windshield when the primary induction coil receives the electrical power; and
    wherein a temperature of the secondary induction coil is controlled by adjusting a voltage or a frequency of a signal applied to the primary induction coil.

2. The heating device in accordance with claim 1, wherein the controller circuit includes a low-Q resonant circuit in electrical communication with the primary induction coil.

3. The heating device in accordance with claim 1, wherein the secondary induction coil is comprised of a first layer of resistive material and a second layer of low-Curie point ferrite.

4. The heating device in accordance with claim 1, wherein the secondary induction coil is located between glass layers of the windshield.

5. The heating device in accordance with claim 1, wherein the secondary induction coil is formed of a conductive material having a greater electrical resistance relative to the primary induction coil.

6. The heating device in accordance with claim 1, wherein the secondary induction coil is characterized as segmented, wherein adjoining segments are formed of materials having a different electrical conductivity from one another.

7. The heating device in accordance with claim 1, wherein a distance between the primary induction coil and the secondary induction coil is in a range from 0.0 mm to 10.0 mm.

8. The heating device in accordance with claim 1, wherein a number of windings on the primary induction coil is at least one.

9. The heating device in accordance with claim 1, wherein a number of windings on the secondary induction coil is at least one.

10. The heating device in accordance with claim 1, wherein the secondary induction coil has a thickness in a range from 1 μm to 1000 μm.

11. The heating device in accordance with claim 1, wherein the secondary induction coil has a width in a range from 0.1 mm to 10 mm.

12. The heating device in accordance with claim 1, wherein the temperature of the secondary induction coil is controlled by adjusting the frequency of the signal applied to the primary induction coil.

13. A camera system comprising:
    a housing comprising:
        a camera lens; and
        an imager configured to receive light via the camera lens and render an image of a surrounding area of the camera system;
    a primary induction coil:
        proximate an end of the housing that is opposite the imager,
        surrounding an optical axis of the camera lens, and
        configured to generate a magnetic field in response to receiving electrical power from a power supply;
    a controller circuit configured to control the electrical power; and
    a secondary induction coil:
        within a windshield of a vehicle or on an inner surface of the windshield, overlaying the primary induction coil,
        defining a viewing window within or on the windshield through which the camera lens views the surrounding area, and
        configured to receive the magnetic field from the primary induction coil and directly heat the viewing window of the windshield when the primary induction coil receives the electrical power,
    wherein a temperature of the secondary induction coil is controlled by adjusting a voltage applied to the primary induction coil or by adjusting a frequency of a signal delivered to the primary induction coil.

14. The camera system of claim 13, wherein the secondary induction coil is further configured to remove condensation from the viewing window.

15. The camera system of claim 13, wherein the secondary induction coil comprises:
    a first layer of resistive material configured to dissipate power transmitted by the magnetic field; and
    a second layer of low Curie point ferrite.

16. The camera system of claim 15, wherein the secondary induction coil is further configured to reduce the heat generated by the secondary induction coil once the secondary induction coil reaches a Curie point temperature.

17. The camera system of claim 16, wherein:
the controller circuit comprises a resonant control circuit in electrical communication with the primary induction coil; and
the reduction of the heat generated by the secondary induction coil causes a resonant frequency of the resonant control circuit to be changed.

18. The camera system of claim 13, wherein the secondary induction coil is located between glass layers of the windshield.

19. The camera system of claim 13, wherein the temperature of the secondary induction coil is controlled by adjusting the frequency of the signal applied to the primary induction coil.

20. The camera system of claim 13, wherein the controller circuit is further configured to monitor an impedance of the primary induction coil to determine a temperature of the primary induction coil.

* * * * *